(12) United States Patent
Kenner (10) Patent No.: US 9,527,135 B2
(45) Date of Patent: Dec. 27, 2016

(54) BAR PULLER

(71) Applicant: Daniel R Kenner, Englewood, CO (US)

(72) Inventor: Daniel R Kenner, Englewood, CO (US)

( * ) Notice: Subject to any disclaimer, the term of this patent is extended or adjusted under 35 U.S.C. 154(b) by 473 days.

(21) Appl. No.: 14/201,731

(22) Filed: Mar. 7, 2014

(65) Prior Publication Data
US 2014/0255129 A1 Sep. 11, 2014

Related U.S. Application Data

(60) Provisional application No. 61/775,450, filed on Mar. 8, 2013.

(51) Int. Cl.
*B23B 13/12* (2006.01)
*B23Q 7/04* (2006.01)

(52) U.S. Cl.
CPC ............ *B23B 13/123* (2013.01); *B23B 13/12* (2013.01); *B23Q 7/043* (2013.01)

(58) Field of Classification Search
CPC ................................ B23B 13/12; B23B 13/123
See application file for complete search history.

(56) References Cited

U.S. PATENT DOCUMENTS

| | | | | |
|---|---|---|---|---|
| 4,404,878 A | * | 9/1983 | Blanchard | B23B 13/021 414/14 |
| 4,580,470 A | * | 4/1986 | Buck | B23B 13/12 414/14 |
| 4,617,847 A | | 10/1986 | Schaldach | |
| 4,709,603 A | * | 12/1987 | Buck | B23B 13/02 414/14 |
| 5,046,226 A | * | 9/1991 | Che | B23B 13/123 29/27 C |
| 5,572,915 A | * | 11/1996 | Bertini | B23B 13/123 292/115 |
| 5,960,689 A | * | 10/1999 | Warren | B23B 13/123 414/14 |

FOREIGN PATENT DOCUMENTS

EP   1870184 B1   7/2009

* cited by examiner

*Primary Examiner* — Christopher Harmon
(74) *Attorney, Agent, or Firm* — Kyle W. Rost (57) ABSTRACT

In a bar puller, pins mount serrated rollers to pivoting arms, which are mounted by additional pins to a bar puller body. The body houses movable cups positioned to compress springs in response to pivoting motion of the pivoting arms. A cover retains the springs and cups in the body. In a manufacturing process where elongated stock material needs to be positioned automatically, such as in a CNC turning center, the bar puller manipulates the elongated material in the machine by holding it rigidly so that the bar puller can move the elongated material on the axis of elongation. This is accomplished by forcing the end effectors over the material, which separates the end effectors by pivoting the arms. The geometry of the pivoting arms causes interaction with the cups and springs to generate an opposing spring force to separate the end effectors.

9 Claims, 5 Drawing Sheets

BAR PULLER

BACKGROUND OF THE INVENTION

Field of the Invention

The invention generally relates to turning by a machine tool, such as by a lathe with a bar feeder. The invention also relates to material or article handling and to stock pulling or pushing. In another aspect, the invention relates to performing operations and transporting, applied to a machine tool performing operations of turning or boring, and especially to accessories such as stops and grippers.

Description of Related Art Including Information Disclosed Under 37 CFR 1.97 and 1.98

In a machine tool such as a lathe, the typical bar stock, billet, or other workpiece, must be advanced from time to time in order to permit sequential working operations to be performed. Various manual or automated devices have been developed to perform the advancing step. One type of device is a pushing mechanism, commonly referred to as a bar feeder. These have disadvantages due to their positioning on the backside of the lathe headstock. Another type of advancing mechanism has been developed to mount or operate from the front side of the lathe collet. The front mount devices are known as bar pullers, and these mount on the tool support or turret of a lathe. On a turret lathe, the bar puller is mounted at one of the several tool stations on the turret and can be moved under manual or automated control to engage the billet, to advance it, and then to withdraw. The exact control mechanism is dependent upon the technology of the lathe. Examples of applicable types of lathe are manual, mechanically automated, and computer automated. The latter group includes numerical control (NC) lathes and computer numerical control (CNC) lathes.

In the known prior art of bar pullers, U.S. Pat. No. 4,617,847 to Schaldach is an example of a scissors-style tool, which employs two arms that cross one another like scissors blades and are joined near their midpoint by a pivot. At their back ends, the two arms are joined by a tension spring that controls the closing force between the front ends of the two arms. In use, the front ends are pushed over the side of the bar to grip it. Then the tool is moved laterally to advance the position of the bar, after which the tool is pulled off the bar from the side. This style of tool is incapable of automatic adjustment to suit different tasks, with a major limitation due to linear operation of the spring, which compromises the ability of the entire tool to open sufficiently to receive the bar, close on the received bar, and maintain required clamping force on the received bar to allow the tool to advance the bar. The relatively large scissors opening needed to receive a given bar requires great expansion of the rear spring. A spring that can expand by a large distance is not typically capable of then closing the jaws with the high force that is needed to pull the bar. Thus, this style of bar puller is unsuited for handling substantial variations in the size of the bar.

U.S. Pat. No. 4,580,470 to Buck shows another style of bar puller wherein pivots mount two rocker arms at a lateral spacing on a tool body. The front ends of the rocker arms each carry a polyurethane roller. The two rollers receive a bar stock between them by rolling around the bar from the side to a position beyond the center point of the bar. A stop pin on the body, between the rocker arms, limits how far the bar stock can enter between the rollers. The result is three point contact with the bar, consisting of the two rollers and the stop pin. Compression springs are mounted between the rear ends of the rocker arms and operate with linear expansion and contraction and urge together the front rollers to receive and grip the bar. The performance range of this tool is limited by the linear acting compression springs; and the length of the rocker arms is a corresponding limitation on the size of bar that the tool can handle for lateral advancement. These springs first have to linearly compress sufficiently to receive the bar between the rollers, next must linearly expand sufficiently to close the rollers behind the center of the bar, and finally must apply sufficient pressure through the rocker arms and rollers to grip the bar with enough force for the tool to pull the bar by lateral movement of the tool. It would be difficult for a single linearly operating spring to perform these functions adequately for reliable operation. Changing springs or selecting a new spring to accommodate a new bar size or weight would be difficult and could be subject to much wasted time due to trial-and-error.

U.S. Pat. No. 4,709,603 shows another bar puller tool by Buck. Like the prior tool, this bar puller has two elongated rocker arms that are separately mounted to a tool body on pivots at a fixed separation. Similarly, the front ends of the rocker arms each carry a polyurethane roller. As in the prior Buck patent, these rollers are laterally applied to the bar to roll around a bar to beyond center point, thereby engaging the bar between the rollers. Another common feature is that a stop screw on the body is located between the rocker arms and serves to stop entrance of the bar between the rollers at a position where the rollers have closed at slightly beyond the center point of the bar. A new feature is that the rear ends of the rocker arms are mounted on threaded screws that grossly adjust the distance between the rear ends, which oppositely adjusts the gross distance between the front ends. This adjustment is made by hand to grossly fit the tool to each size of bar by closing the front ends to slightly less than the diameter of the bar. A small, linearly acting pressure adjustment spring is in compression between the rear ends of the rocker arms and allows the front ends to open by a small amount beyond the gross adjustment to receive the bar. The small, linearly acting spring then closes the front ends around the bar stock by a small distance. Thus, as in the prior Buck patent, this bar puller achieves three point contact on the bar stock, consisting of the two rollers and the stop screw. This tool is limited in its operation by the tiny capacity of the small, pressure adjusting spring. Spring performance is a necessary function rocker arm length, which means that the rocker arms are limited to a tight range of lengths. A significant limitation of this tool is that the same small spring is applied at the length of the rocker arm to every size of bar stock, thus applying limited force for gripping different sized bars. There is little or no variability available in gripping force to accommodate different sizes of bars. The bar puller also is limited by the need to manually fit all three contact points to each different size of bar. These ad hoc manual adjustments are undesirable because they are prone to waste time and are subject to error in each adjustment. In addition, the rocker arms and small spring lack significant capacity for adjustment in performance, which means that the bar puller is difficult to adapt to a substantial variety of sizes and weights of bar stock.

U.S. Pat. No. 5,960,689 to Warren shows a bar puller that is structured somewhat similarly to Buck '603 but engages the bar by axial movement, where the tool is positioned in alignment with the axial end of the bar during bar pulling operation. The engagement is only two-point rather than three, across a diameter of the bar. As in Buck '603, two elongated rocker arms are mounted to a tool body on pivots, and a gross adjusting screw is present for closing the rocker arms to slightly less than the dimension of the bar. However, in Warren the pivots are at the rear of the rocker arms and the gross size adjusting screw is at the center of the rocker arms. The front ends of the rocker arms are jaws that each carry a spring-mounted skid that is pushed toward the other jaw by a linear spring. The pair of skids can open slightly against the linear springs when the bar is forced between the jaws. The linearly acting springs function similarly to Bucks small pressure spring to provide limited pressure in the grip of the jaws. The springs are eccentrically connected to the skids so that the skids can extend at their back ends to apply extra gripping force when the bar is pulled back from the skids, such as when the tool is pulling the bar. The limitations of this tool are similar to those discussed in connection with Buck '603.

European Patent EP1870184 to Silvennoinen shows a bar puller that substantially eliminates the usual rocker arms. Instead, this puller employs a transversely elongated tool body that is transverse to the axis of the bar stock. A core of the body houses two slides that are spring-loaded on linearly acting springs. Each slide carries an external skid. The slides are spring loaded toward the center of the tool body, thus urging the skids to a closed, central position. The tool body must be located beyond the axial end of the bar so that it can approach the bar from a lateral position, but the tool body also must be moved over the axial end of the bar into a position of axial alignment. During the lateral approach, the skids strike the side of the bar and are forced apart. The skids continue to receive the bar between them until they achieve a two-point grip along a diameter of the bar. Correspondingly, the tool body will have reached the position of axial alignment at the end of the bar. This final axial positioning of the tool body is essential because the tool body lacks any rocker arms. This bar puller is limited in capacity by the use of linear springs in the body, where the same springs must accommodate linearly opening of the skids to receive the diameter of the bar and also applying sufficient grip by linear expansion to hold the bar while the bar is pulled. This tool has the further capacity limitation set by the lack of any rocker arms, which prevents the skids from opening beyond their linear range within the length of the tool body.

The development of digital technology allows great accuracy in controlling the movement and position of the lathe turret and, hence, the movement and position of a bar puller. However, the technology can be limited by the inherent capability of the bar puller. The advances in technology that are realized, for example, in the CNC lathe, relate in part to minimizing setup time and reducing the need for tooling change out. Accordingly, the ability to use automation in advancing the workpiece is optimized when the bar puller offers improved ability to engage the workpiece under a variety of conditions. Similarly, the bar puller improves efficiency when a single bar puller can accommodate an increased range of billet sizes and when this large range of handling capacity is achieved without requiring the tool to be manually adjusted for a change in size.

To achieve the foregoing and other objects and in accordance with the purpose of the present invention, as embodied and broadly described herein, the method and apparatus of this invention may comprise the following.

BRIEF SUMMARY OF THE INVENTION

Against the described background, it is therefore a general object of the invention to provide an improved bar puller with increased robustness.

Another object is to improve the coordination between size of a workpiece such as a billet or bar stock and the gripping force generated between a pair of gripping arms. This is achieved by the use of pivoting arms that have an integral eccentric surface, such as a contact surface or a cam with profile that coordinates gripping force as a function of the position of the pivoting arms. The cam profile compresses a spring along a displacement curve that increases at a decreasing rate with increasing degree of pivot.

A further object is to enable the construction of a bar puller that does not require adjustment or allowances for use with different sizes of billet material. This is achieved by use of a urethane spring and a cam profile that conforms the small compression of such a spring to a wide range of workpiece sizes. The eccentric or cam lobe is applied to directly displace a piston that acts against the spring.

Still another object is to create a bar puller that combines a rolling reception of a billet with stability of engagement. The pivot arms carry end effectors that spin and roll but are friction loaded to prevent failure of engagement while being held. In application to a bar puller, the term, "end effector," refers to an object that has the power to produce a result. In most simple form, the nonlimiting result is to grip an object that is to be moved.

An additional object is to engage a billet between rolling end effectors such that the rolling engagement does not mar the billet material. Similarly, the rolling end effectors engage the billet with low shock entry.

According to the invention, a relocating tool is best suited for use when mounted on an automated machine that controls movement of the relocating tool to engage, reposition, and disengage a workpiece. The relocating tool is formed of a body that defines two parallel spring chambers. Each spring chamber has a bottom opening, and each contains a spring. A slidable piston is located below the spring in a position where the piston can be contacted near the bottom opening to raise the piston and correspondingly compress the spring. A pair of pivot arms is attached to the body near their top ends, where an axle pin secures each pivot arm to the body and allows the opposite, bottom ends of the pivot arms to pivot between a position of relative minimum separation and a position of relative maximum separation. Each pivot arm of the pair has an inside facing side wall surface that in the position of minimum separation is laterally nearest to the other pivot arm. Each pivot arm of the pair also has an outside facing side wall that when in the position of minimum separation is laterally furthest or opposite from the other pivot arm. Each pivot arm is attached to the body at a location where the respective pivot arm is associated by proximity with a different one of the spring chambers. The pivot axle maintains the top end of each pivot arm in juxtaposition to the bottom opening of the associated spring chamber, in a location where swinging the bottom ends of the pivot arms toward the position of maximum separation causes an outside end portion of the respective top ends to raise the pistons in the associated spring chambers and compress the contained springs. The outside end portion of the top end of each pivot arm defines a cam that has a profile that is eccentric with respect to the pivot axle. The eccentric profile is a contact surface that operatively engages the spring and controls how far the spring is compressed as each pivot arm progressively increases its angle of pivot toward the outside. The cam profile is such that with increasing pivot angle, the cam compresses the spring along a displacement curve that increases at a decreasing rate.

The bar puller is formed of grippers or end effectors that are mounted to pivoting arms and held to these arms by means of axle pins. The end effectors rotate on the axle pins but are restrained from such rotation by friction washers and spring washers that act between the axle pins and end effectors to prevent the end effectors from rotating too freely. The restrained rotation stabilizes the grip of the end effectors on grasped workpieces. Another set of pins mounts the pivoting arms to a body. The body houses a plurality of movable cups or pistons arranged to compress the springs in response to outward pivotal movement of the pivoting arms.

The bar puller is to be used in manufacturing processes where elongated infeed material needs to be automatically gripped and positioned. For example in a CNC turning center, elongated infeed material is held rigidly in the spindle of the machine until the machining operation is complete. Then the bar puller is used to manipulate the elongated infeed material in the machine by engaging and holding the elongated material rigidly, and then moving the elongated material in the direction of elongation, which follows the linear axis of the material. This is accomplished by forcing the end effectors over the material, which separates the end effectors. The separation process generates an opposing force because the geometry of the arms moves the cups and springs in a direction that generates spring force opposing separation of the arms.

The accompanying drawings, which are incorporated in and form a part of the specification, illustrate preferred embodiments of the present invention, and together with the description, serve to explain the principles of the invention. In the drawings:

DETAILED DESCRIPTION OF THE INVENTION

The invention is an improved apparatus of the type known as a bar puller 10, for selectively advancing a workpiece such as bar stock that is being fed into a machine tool. In a second aspect, the invention is a device for relocating a workpiece of any identity, whether or not characterized as bar stock and whether or not the workpiece is being fed into a machine tool. Examples of these other areas where the bar puller has utility are in robotics and with pick and place machines. Accordingly, while the term "bar puller" may be applied to the invention, this is merely a shorthand designation for a tool that cam be used to relocate an unlimited variety of workpieces.

In many applications, the workpiece being fed through a machine tool is a billet, bar stock, or simply a bar. For convenience of description and not as a limitation, the typical term, "billet," often will be used to refer to the workpiece, without excluding any other type of workpiece. Directional terms such as "radial" or "radially" may be applied to motions of a controlling machine tool with respect to the billet. These terms may refer to a billet that is cylindrical and, thus, has a clearly defined radius. Although these terms have clearest meaning when the billet is such a cylinder, bar, or rod, these terms readily can be understood when applied to analogous positions and motions with respect to any other shape of billet or workpiece. Thus, a "radial" approach also refers to a lateral approach toward an axially elongated workpiece, whether it is cylindrical (round), hexagonal, square, or some other cross-sectional shape.

As described, below, the bar puller 10 is used in a mounted environment where the position and orientation of the bar puller is precisely known or established. Likewise, the billet is mounted in a tool where position and orientation of the billet is precisely known or established. Thus, the relative relationships between the position and orientation of the bar puller 10 and the billet are established by a machine tool and by the computer that controls operation of the machine tool. Normally the relationship is under computer control and is highly precise, although subject to human variance due to actions of a human operator.

In optimal usage for advancing bar stock, the bar puller 10 is to be mounted on an automated carrier of a machine tool, such that the carrier moves the bar puller into precision engagement with the billet, advances the bar puller to advance the billet, and then withdraws the bar puller from the billet. For purposes of example and description, the machine tool may be referred to as being a turret lathe, without excluding possible application to any other type of machine tool. A turret lathe is provided with a multi-station turret, capable of carrying a selected tool at each station. The bar puller is one type of tool that can be mounted at a station on the turret. Especially on a turret lathe of the types known as NC or CNC, a digital computer causes the turret to move with precision, enabling the bar puller to be repeatedly applied to the billet and to repeatedly move the billet with precision.

A typical CNC turret lathe is formed of a headstock with a rotatable spindle that carries the billet in a rotary headpiece or chuck, where a portion of the billet extends from the chuck to be operated upon by various cutting tools. The turret carries the cutting tools mounted in known, indexed positions, which may be referred to as tool supports or tool stations. The turret rotates between the indexed positions to selectively apply desired tools to operate on the billet. The digital computer is able to repeatedly apply selected tools to sequential portions of the billet, thereby producing a series of substantially identical finished products. The turret is supported for both radial and axial movement with respect to the portion of the billet extending from the headpiece.

With reference to the drawings, under computer control the turret is capable of moving a bar puller 10, mounted to a tool station on the turret, radially toward the extending portion of the billet to engage the billet, then axially to advance the billet with respect to the headpiece or chuck, and then to radially withdraw the bar puller from the billet. Computer control also accommodates all peripherally necessary actions such as timely starting and stopping the rotary motion of the lathe, timely opening of the chuck to enable axial pulling of the billet, and timely reclosing the chuck at the conclusion of the axial pulling.

With reference to FIGS. 5-9 of the drawings, bar puller 10 is illustrated in several views, all of which show a workpiece such as billet 12 engaged with the bar puller. The interaction between the bar puller 10 and a variety of differently dimensioned workpieces or billets 12 is important to the improvement of this invention, although the billet 12 is not, per se, a component of the bar puller 10.

Figure 1:
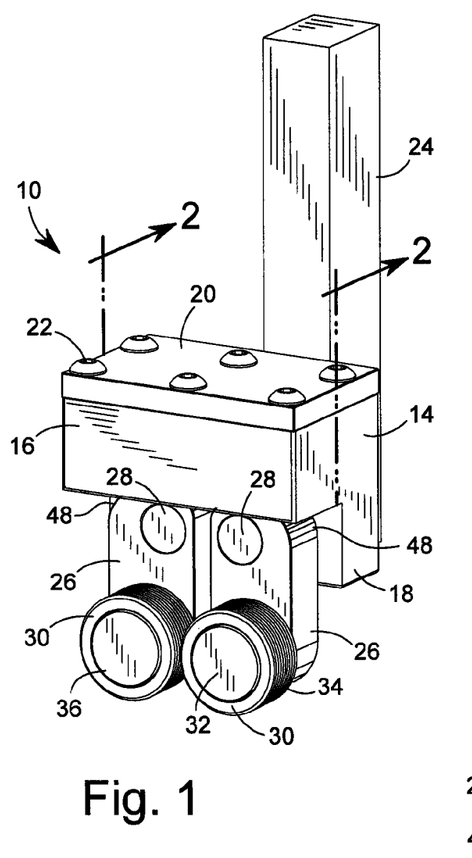
FIG. 1 is an isometric view of the bar puller, taken from a front and upper right position.
Figure 2:
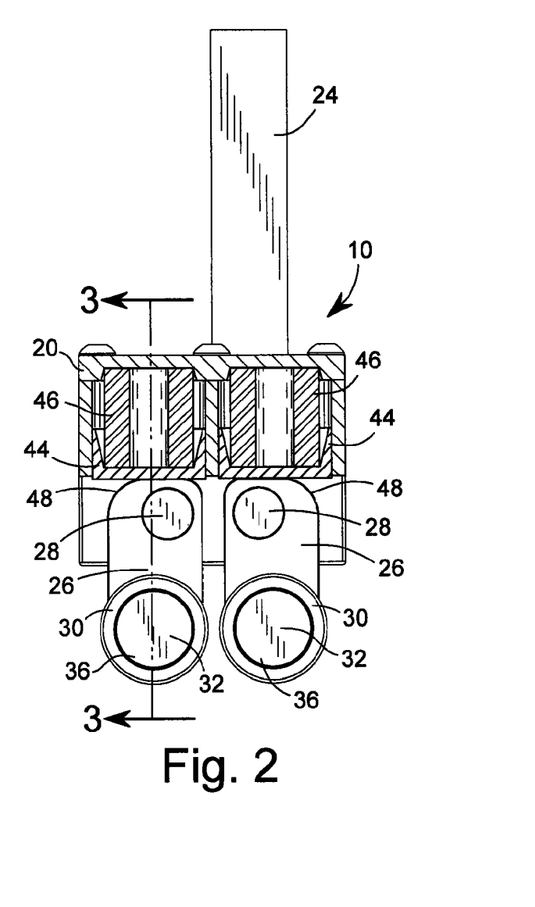
FIG. 2 is a front elevational view thereof in partial cross-sectional taken at the plane of lines 2-2 of FIG. 1.

FIGS. 1-2 show the bar puller 10 with an optional attached mounting arm 24, which is a generic supplemental element used with many types of tools. The mounting arm engages a station of the turret and allows bar puller 10 to be mounted in a known location and orientation. Apart from the mounting arm, the bar puller 10 is formed of a body 14 having two functional sub-portions. According to the orientation shown in the drawings, a first portion or upper chamber is a spring housing 16, which provides a positional attachment or container for spring elements, which will be further described, below. A second body portion is a depending flange wall or carrier bracket 18, which provides a positional attachment for pivot arms, as will be further described, below. The two sub-portions of body 14 establish suitable relative positions of the pivot arms and spring elements, so that these components are located to interact in a functional manner to produce the improvements of the invention.

Figure 5:
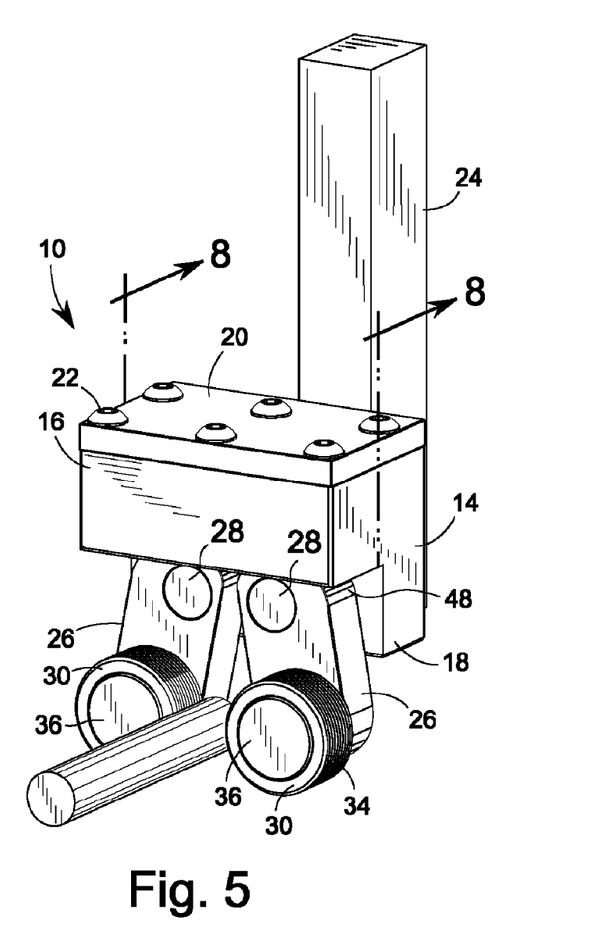
FIG. 5 is an isometric view thereof similar to FIG. 1, showing the bar puller carrying a workpiece.
Figures 6, 7:
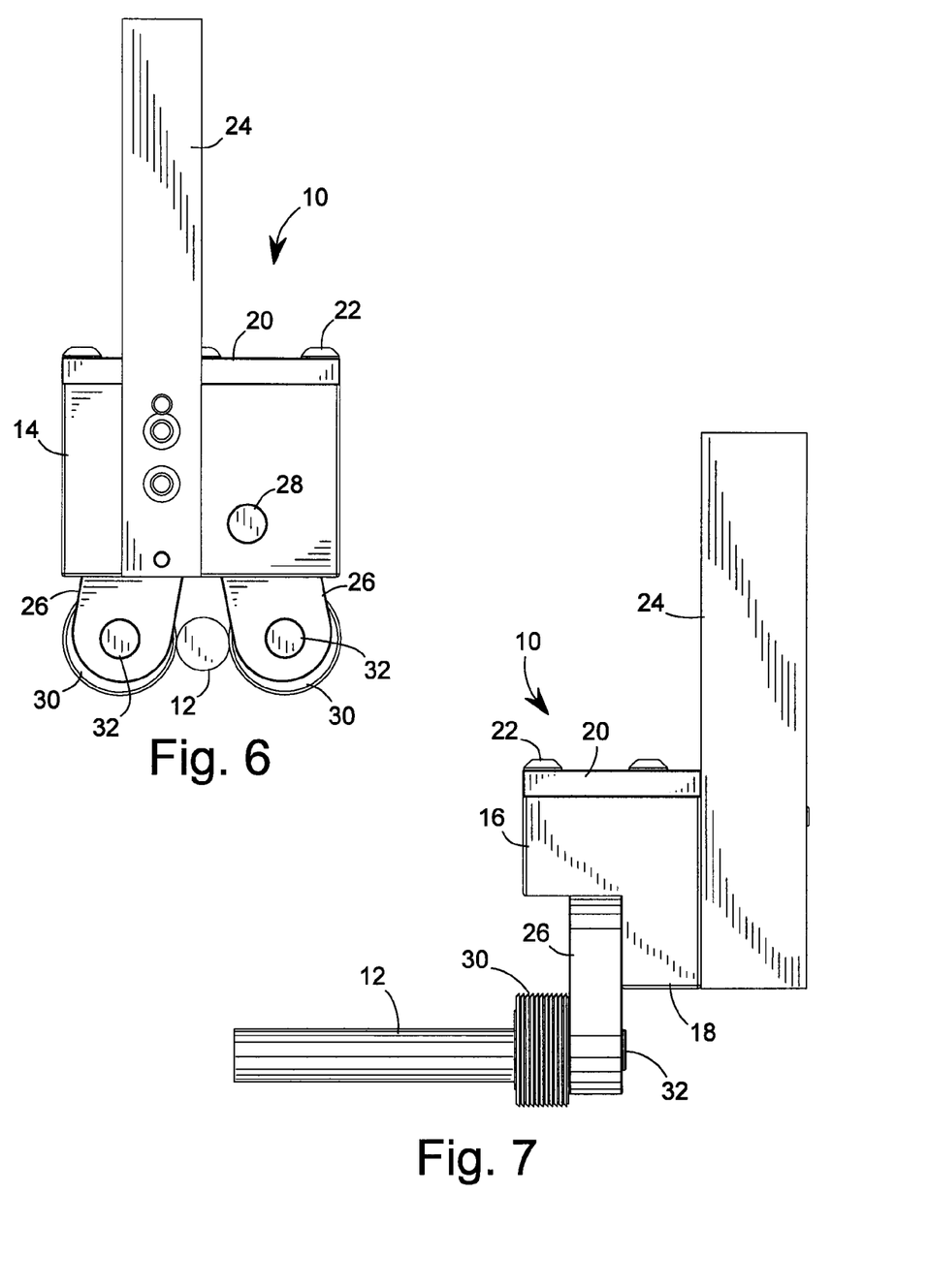
FIG. 6 is a rear elevational view of the bar puller of FIG. 5.
FIG. 7 is a right side elevational view of the bar puller of FIG. 5.

The drawings further show a suitable arrangement of components attached to body 14. The body serves as the attachment base for a cover 20, which is secured to body 14 at the top of spring housing 16 by a plurality of removable fasteners 22. The cover closes a top opening of the spring housing 16. The cover also may serve as a reaction surface for springs contained in spring housing 16. The cross bar or elongated attaching arm 24 is fastened to body 14 for use in mounting the bar puller 10 to a tool support or lathe turret at a tool station. For example, arm 24 can be clamped at a tool station to carry the remainder of bar puller 10 in a functional operating orientation with respect to an associated lathe turret. In the views of FIGS. 5-7, the attaching arm is shown as oriented to extend vertically in perpendicular relationship to the longitudinal axis of an elongated workpiece or billet 12, when the billet is engaged in bar puller 10.

Carrier bracket 18 of body 14 orients and supports a top or proximal end of a pair of pivot arms 26, where the top is proximal with respect to the spring housing. These may be referred to as right and left pivot arms 26, according to their right or left side position in the orientation of FIGS. 1, 2, 8 and 9. From a front view of the pivot arms as shown in FIG. 2, the right and left pivot arms are configured as mirror images of one another. Each pivot arm 26 is mounted to a front wall of a carrier bracket 18 by a pivotal securement such as an arm pin 28. Preferably, the arm pins are parallel, and the pivot arms are coplanar. A predetermined spacing between the arm pins 28 positions the pivot arms at a predetermined mutual separation on the bracket 18. The separation may be zero, although a separation greater than zero is shown in the drawings and is required by the illustrated geometry of the pivot arms 26. The arm pins 28 position arms 26 at predetermined positions in relationship to the bottom of spring housing 16, to establish interaction with spring elements in housing 16. The predetermined position with respect to the spring elements may be a contact relationship, typically by contact of the pivot arm tops against intermediate elements such as cups or pistons, with a spring preload applied even at the position of minimum separation. The degree of interaction with a spring element is variable according to the relative angular orientation of each pivot arm, as suggested by different orientations illustrated in FIGS. 6-9, and further explained, below.

As viewed in FIG. 1-4 where the pivot arms 26 are at minimum separation and may be parallel, pivot arms 26 are longitudinally elongated from top to bottom, or on a proximal to distal end axis. The bottom or distal end of each pivot arm 26 carries a gripper or end effector 30. Viewing the pivot arms as vertical and parallel in FIGS. 1-4, the pivot arms 26 do not carry the arm pin 28 and gripper 30 on a common axis of elongation. Instead, the arm pins 28 are closer to the inside edges of the pivot arms, and the grippers are closer to the outside edges of the pivot arms. According to another description, if an axis extends from the arm pin 28 to the gripper 30 of each pivot arm when oriented in the position of minimum separation, these axes converge toward the proximal ends at spring housing 16 and diverge toward the distal ends of the pivot arms. This relative arrangement of the arm pins and grippers establishes that when the distal ends of the pivot arms are pushed down on a workpiece, the pivot arms 26 are forced to separate to receive the workpiece between them.

One suitable configuration for a gripper or end effector is as a rotatable roller 30. Roller-shaped end effectors 30 directly engage a billet 12 when applied against such a billet, typically with the end effectors oriented symmetrically to the billet such that the billet enters precisely along a centerline between the end effectors. The pivot arms 26 swing apart or together as necessary on respective arm pins 28 to accommodate a fit over the billet. An axle pin 32 connects each end effector 30 at a distal end of a respective one of the pivot arms 26. Axle pins 32 establish the rotary axes for the end effectors. Axle pins 32 are disposed in a horizontal position with respect to the exemplary vertical orientation of the bar puller 10 as shown in the drawings. Correspondingly, the proper orientation of the bar puller is such that axle pins 32 establish axes of rotation that are parallel to the longitudinal axis of the intended workpiece, such as billet 12. According to the embodiment shown in the drawings, the end effectors 30 rotate on the axle pins 32, as the axle pins are nonrotatably mounted to pivot arms 26, such as by a press fit into suitably sized receiving bores of the pivot arms.

Figure 3:
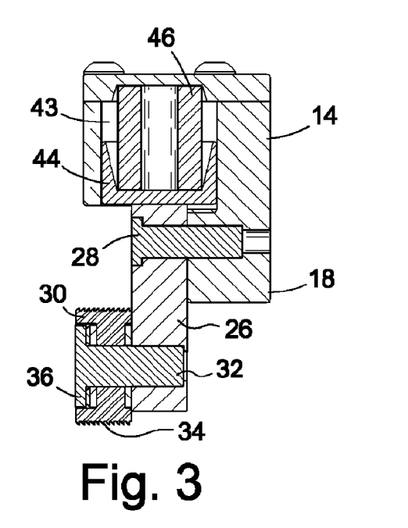
FIG. 3 is a cross-sectional view thereof taken at the plane of lines 3-3 of FIG. 2.
Figure 4:
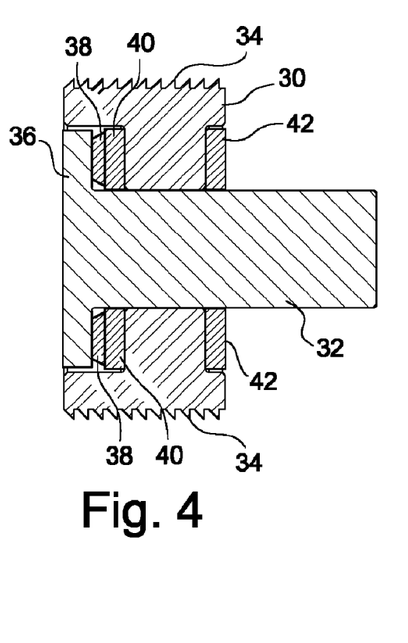
FIG. 4 is a fragmentary, enlarged view thereof from FIG. 3, showing an end effector and axle pin.

End effectors 30 are rotatable with respect to pivot arms 26. In the illustrated embodiment, each end effector 30 is rotatable with respect to its axle pin 32, which enables the end effectors to engage a billet 12 with rolling motion to produce smooth, low shock engagement with billet 12. As shown in FIGS. 3 and 4, each end effector 30 optionally is roller-shaped such that it is configured approximately as a toroid or similarly to a hollow cylinder. Optionally, the circumferential surface of the end effector is formed of a selected surface material, treatment, or physical texture for engaging and retaining grip on a billet with preselected frictional characteristics. As one example of a selected surface material, the end effector may carry a layer of synthetic plastic or elastomeric material such as polyurethane. As a second example, the surface of the end effector may be machined to form thereon friction elements 34 arranged in an annular pattern, where each annular friction element lies in a perpendicular plane to the axis of rotation of the end effector. As best shown in FIG. 4, the optional friction elements may be arranged in a plurality of rows of frusto-conical teeth or beveled ridges 34. A central passage through each end effector 30 receives the shank of an axle pin 32, and the front face of each end effector 30, which is the left face according to the views of FIGS. 3 and 4, defines a front, central, recessed pocket that is sized to receive the wider head 36 at the front end of an axle pin 32.

The end effectors are carried on pivot arms 26 with a mounting that is not freely rotating. Rather, the mounting allows rotation only with substantial friction or under substantial force. The mounting includes braking elements, which are nonrotatable or only slightly rotatable. According to the illustrated embodiment of such a mounting as best shown in FIG. 4, a Belleville washer 38 is located on pin 32 in the front, central recess between axle pin head 36 and the front face of end effector 30. The head 36 of axle pin 32 compresses the Belleville washer 38 between head 36 and end effector 30 to frictionally restrain rotation of end effector 30 on axle pin 32. The Belleville washer, which is dished when in uncompressed configuration, applies friction to the end effector, relative to nonrotatable axle pin 32. A front thrust washer 40 is located on pin 32 between the Belleville washer and the front face of the end effector. A rear thrust washer 42 is located on pin 32 between the rear face of the end effector and the front face of pivot arm 26. A rear recess in the rear face of end effector 30 may receive rear thrust washer 42 over a portion of its thickness, such that a portion of thrust washer 40 extending from the rear recess functions by spacing end effector 30 from direct contact with pivot arm 26.

The frictional mounting of end effector 30 on axle pin 32 retains the billet against accidental dropping, such as might occur if the billet has been inserted between end effectors 30 with slight misalignment of diameters or centerlines between end effectors and billet. The proper engagement of end effectors and billet has a contact point with each end effector aligned with a single diameter or transverse centerline of the billet. The friction-loaded end effectors provide smooth engagement with reduction in marring and result in non-slip, friction loaded grip with the billet.

Figure 8:
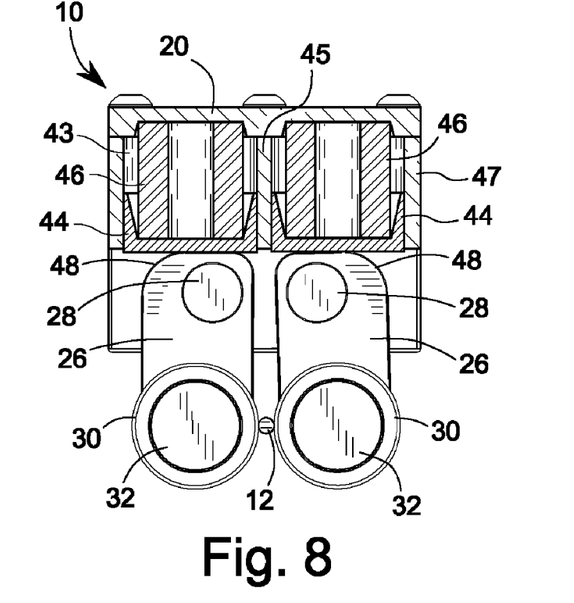
FIG. 8 is a front elevational view of the bar puller with the omission of an attaching arm, showing a small workpiece carried in grippers, and showing the body in cross-section taken along the plane of lines 8-8 of FIG. 5.
Figure 9:
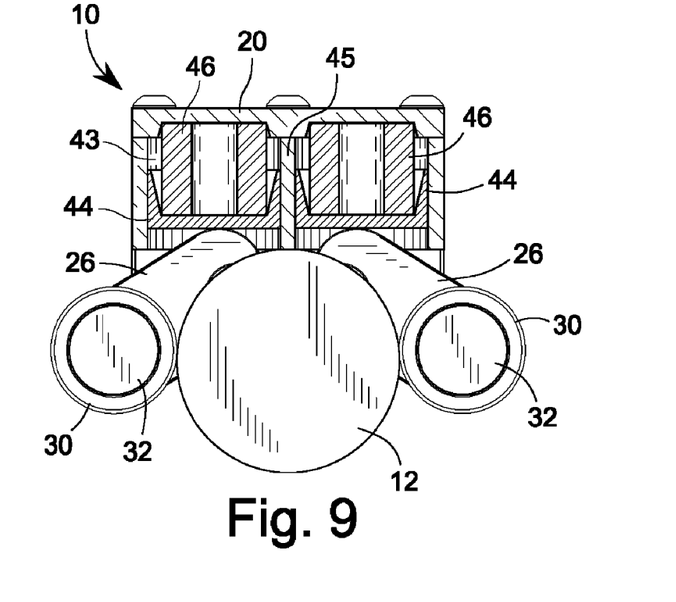
FIG. 9 is a view similar to FIG. 8, showing a large workpiece carried in grippers.

FIGS. 6-9 illustrate both the operation of the bar puller 10 and the range of billet sizes that a single bar puller 10 can accommodate, all without mechanical adjustment. The spring housing 16 preferably contains two parallel, vertical bores 43, each having an open bottom and serving as a spring chamber that contains a spring-loaded piston, cup, or lifter, that acts through the open bottom against one of the corresponding pivot arms 26. For example, a resilient urethane cylinder 46 is located on top of a slidable piston or cup 44 in each bore 43. The urethane cylinder 46 acts as a spring to spring-load the piston or cup 44 downwardly against the proximal end of the underlying pivot arm 26. This spring resides in a spring chamber and reacts between cover 20 and cup 44 to press the cup against the proximal end of a respective one of the pivot arms 26. According to the embodiment of FIGS. 1-9, the two bores 43 are laterally adjacent to one another, with minimal separation. A central, intermediate wall 45, FIGS. 8 and 9, is of approximately the same thickness as the outer side walls 47 of the spring housing 16 at the outer side edges of bores 43.

Each pivot arm is considered to be associated by proximity with one of the spring chambers 43 and, hence, with the piston 44 and urethane spring 46 in that chamber. Each pivot arm 26 is positioned such that its top edge is in contact with its associated piston 44 through the open bottom of the associated spring chamber. Pivotal movement of the pivot arms toward a separated position will raise the piston and thereby increasingly compress the spring. The number of spring chambers and the number of pivot arms can be greater than two, although the number of pivot arms and spring chambers should match, and each of a plurality of pivot arms should be associated with a separate spring chamber, as described. The invention is applicable to three or more associated spring chambers and pivot arms, as three grippers in triangular array are appropriate for moving a workpiece such as a ball that lacks an elongated central axis. Thus, references to two spring chambers and two pivot arms or a pair of pivot arms should be understood to refer to this number as the minimum practical number of such components.

An aspect of the invention that enables the bar puller to handle a wide range of workpiece sizes is the high force at small compressions of a urethane or polyurethane spring. This type of spring has exceedingly high load carrying capacity at very small displacement. The invention is a means of managing this high load carrying capacity by adapting the pivot arms to compress the urethane springs at a decreasing rate as the capacity of the pivot arms increases.

Urethane springs are selected to provide performance enhancements as compared to conventional steel springs in bar puller 10. Notably, urethane springs provide high load-carrying capability, high dielectric strength, are non-magnetic, protect against marring and galling, have longer life, provide abrasion resistance, provide oil and solvent resistance, are low noise, absorb shock, damp vibration, provide one-hundred percent load-bearing surface, are bondable to mating parts, and are effective between minus 30° F. and plus 180° F. Comparing load-carrying capacity of a urethane spring versus a steel die spring in terms of pounds that cause ⅛ inch deflection, the load-carrying capacity of the steel spring is 500 pounds, while the load carrying capacity of the urethane spring is 2600 pounds.

The bar puller 10 is assembled to preload springs 46 with respect to pivot arms 26. The pivot arms 26 have a minimum separation, neutral position as shown in FIGS. 1 and 2, where the pivot arms are empty and hang freely, although under preload, and are separated by a gap. The location of arm pins 28 and the height of springs 46 are respectively suitable to establish the preload in neutral position.

In describing the portions of pivot arms 26 according to the orientation in the view of FIG. 2, the following relative terms will be applied: "top" refers to the top of the view, which in this view is adjacent to cups 44; "bottom" refers to the bottom of the view, which in this view is hidden behind end effectors 30; "outside" refers to the edge or surface of either of the two pivot arms that is laterally furthest from the other pivot arm; and "inside" refers to the edge or surface of either of the two pivot arms that is laterally nearest to the other pivot arm. For example in FIG. 2, the outside of the left-hand pivot arm is the left edge, and the inside of the left-hand pivot arm is the right edge. For convenience of description, this relative orientation may be used throughout the description and in the claims.

The following description is for an exemplary and non-limiting configuration of pivot arms 26, given to further explain details of the preload and pivot arm operation. In two dimensional terms, the front view of a pivot arm 26, such as shown in FIG. 2, can be regarded as showing a modified rectangle that is positioned with short edges at top and bottom and long edges at inside and outside. End effector 30, and hence axle pin 32, is mounted near the bottom short edge or distal end of the pivot arm. The length of a short edge is shorter than the width of an end effector 30. In addition, the bottom short edge may be modified by reconfiguration into any necessary shape that is recessed from the bottom peripheral surface of carried end effector 30. The recessed shape may be a curve, and a suitable curve may be a half-circle arc as shown in FIG. 7, that interconnects inside and outside edges at the bottom of the pivot arm. The purpose of configuring the bottom of the pivot arm to be recessed from the peripheral surface of carried end effector 30 is to eliminate interference between the bottom of the pivot arm 26 and a carried billet 12 over a range of billet sizes, so that the billet within such a range of sizes will contact end effector 30 without contacting pivot arm 26.

The top short edge is modified at the outside corner 48 into an eccentric cam surface or eccentric curve, where eccentricity is determined with respect to the pivot point established by arm pin 28. As an example, a suitable cam curve is a quarter-circle arc 48, which allows the inside portion of the top short edge to remain as a straight line near the center and inside portion of the top edge. Other suitable cam curves can be applied to control and distribute the force of the urethane spring. Smaller cam surfaces such as one-eighth circle may be suitable. Hence, in terms of three-dimensional structure, the top surface of the pivot arm includes a substantial flat surface near the center and inside portion of the top surface, with a cam surface at the outside edge of the top surface.

Arm pin 28 is carried by pivot arm 26 at a position offset toward the inside edge of the pivot arm from the center point of the circle establishing the quarter-circle cam arc. The offset disposes cam curve 48 in eccentric configuration with respect to arm pin 28. According to the eccentricity of the quarter-circle arc 48, the arc is nearest to arm pin 28 at the end of the arc merging into the flat surface of the top. The surface of the arc becomes progressively farther from arm pin 28 as the arc nears the straight outside edge of the pivot arm. The pivot arm is arranged in sufficiently close proximity to its associated spring chamber 43 to be pre-loaded against the spring when the top surface or the pivot arm is horizontal, which is parallel to the bottom of cup 44. This is the neutral or resting position of the pivot arm according to physics, with spring compression being minimized. The relative positions of the end effectors may establish a neutral gap corresponding to the gap that is present when the flat tops of the pivot arms are parallel to the bottoms of cups 44 and, hence, are not applying force other than the preload.

In the neutral position illustrated in FIGS. 1 and 2, the vertical axes of the pivot arms are parallel to one another, and the end effectors are at minimum separation. As shown by comparison of FIGS. 8 and 9, progressively increasing separation of the end effectors advances the contact point between the pivot arms and cups toward the outside and bottom of the eccentric curves 48. As the contact point advances toward the outside and bottom of curve 48, the thickness of the pivot arm between the contact point and arm pin 28 is progressively greater. The increasing thickness increasingly displaces cups 44 upward to correspondingly increase compression of the springs 46. Increasing spring compression applies an increasing reaction-force against the cups, which is passed through to pivot arms 26 to grip the workpiece 12 with increasing force. The high load-carrying capacity of urethane springs, as described above, leads to creation of high opposing force to the separation of end effectors 26. Thus, bar puller 10 has high capacity to engage and retain a billet over an exceptionally large range of sizes. Notably, the pre-load that is present in neutral position translates into the ability to engage and retain a billet that is only nominally greater in diameter than the neutral gap between end effectors, as suggested in FIG. 8. Thus, the bar puller 10 handles an exceptionally large range of billet sizes.

The geometry of pivot arms 26 in the neutral position of FIG. 2 shows that even in neutral position, arm pins 28 are laterally offset to the inside, relative to the position of pivot axles 32. Stated another way, pivot axles 32 are laterally offset to the outside of arm pins 28. This relative lateral positioning shows that if an axis is viewed as extending between pin 28 and axle 32 on each pivot arm, these would be disposed at a small intersecting angle, such that the end effectors are predisposed to open to receive a billet even if the billet contacts the end effectors 30 slightly off-center from perfect alignment with the neutral gap.

As explained, above, the exemplary description is non-limiting. It contains description of elements with detail that is non-essential to achieving the objectives of the invention. In particular, the configuration of the pivot arms might vary considerably from the exemplary description, while maintaining the desired functionality and method of operation.

FIGS. 5-9 provide visual examples of small, mid-sized, and large work pieces engaged in the same bar puller 10, while FIGS. 1-2 provide examples of the bar puller 10 in neutral position. In FIGS. 1-2, urethane springs 46 are in preloaded condition, where the springs are compressed, as an example, by 0.010 to 0.020 inches and the pivot arms 26 are parallel. By comparison, the very small billet shown in FIG. 8 has separated the end effectors by a nominal amount. Yet, the preload and the corresponding high force generated by even small additional compression of the springs enables the bar puller to be functional even when the end effectors are only nominally opened. FIG. 8 suggests a remarkable lower limit on the range of billet sizes that the bar puller 10 can handle without adjustment.

In the example shown by FIG. 9, the urethane springs 46 are in maximum compressed condition according to the capacity of bar puller 10. The pivot arms 26 are separated by a large angle at end effectors 30 and are open by about one hundred sixty degrees. In FIG. 9, end effectors 30 are engaging the large billet 12 by contact across the centerline of the billet. At the same time, the large billet is at the maximum capacity of the illustrated bar puller design. Maximum capacity is reached when the workpiece is properly engaged between end effectors 30 while entered in the space between the pivot arms to the maximum available distance. Maximum entry is determined when the billet has struck interference, such as the bottom of wall 18 or spring housing 16 and, thus, can enter no further. In this respect, FIG. 9 suggests a maximum billet size for a bar puller 10 of the illustrated design. If the diameter of the small billet of FIG. 8 is compared to the diameter of the large billet of FIG. 9, the ratio of the diameters is large, falling in the approximate range from about 1:10 to 1:14.

The pivot arms 26 interact with urethane springs 46 to apply adequate holding force through end effectors 30 over a wide range of pivot arm positions. As best shown in FIG. 8 and by comparison with FIG. 9, force is regulated by an integral eccentric curve on the top outer corner of the pivot arm. Eccentric curve surface 48 contacts cup 44 with diverging distance from the axis of arm pin 28 as the separation angle of the pivot arms increases. This eccentric curve functions as a cam lobe that directly displaces cup 44 to increasingly compress the urethane spring as the bar puller receives larger billets. The curvature controls the increase in compressive force to coordinate the force with the requirements of each billet size. Comparison of cup position in FIGS. 8 and 9 shows a distinctly higher position of cup 44 in FIG. 9, corresponding to the wider angular separation of pivot arms 26 and corresponding to the greater diameter of the billet in FIG. 9.

EXAMPLE

The following table compares the height of urethane spring 46 with increasing angular separation of the pivot arms 26, in bar puller 10 of the indicated dimensions:

| | |
|---|---|
| Separation between center points of arm pin 28 and axle pin 32 (inch): | 1.26 |
| Separation between arm pins 28 of right and left pivot arms (inch): | 0.875 |
| End effector 30 diameter (inch): | 1.00 |
| Radius of eccentric curve 48 (inch): | 0.375 |
| Non-preload height of spring: | 1.00 |

| Urethane Spring Height (inch) | Billet Diameter (inch) |
|---|---|
| 0.99 | Preload only |
| 0.98 | 0.20 |
| 0.78 | 1.90 |

In operation, a billet 12 in an automated machine tool such as a CNC turning center requires linear advancement at certain times in the manufacturing process, such as when work on one portion of the billet has been completed and another portion of the billet should be moved into the work area. A bar puller 10, which is attached to a turret or other tool support of the automated machine tool, is moved laterally or radially inwardly toward the billet. Contact between the end effectors and billet causes end effectors 30 to separate sufficiently to engage billet 12 by rolling over opposite sides of the billet. At the same time, the end effectors guide the pivot arms 26 on an empirical basis to achieve the necessary spacing to receive the billet between them. An eccentric curve or cam lobe 48 on each of the pivot arms urges a carried cup 44 in a proximity-associated spring chamber to compress the associated spring 46 to generate an opposing force, which maintains the two end effectors in cooperative gripping contact with the billet, where the amount of generated opposing force is a function of the empirically encountered diameter of the billet.

Under proper programming, the turret advances under guidance from the automated tool to place the end effectors on opposite sides of the billet, across the longitudinal axis or centerline of the billet, which is known because the billet is located with precision within the machine tool. Thereafter, the turret axially moves the bar puller 10 by a programmed distance with respect to the longitudinal axis of the billet. This movement also longitudinally advances the billet by the same distance. The automated tool then moves the turret radially or laterally outwardly from the billet to withdraw the bar puller from the billet. End effectors 30 are drawn back over and out of engagement from the billet.

Figures 10, 11:
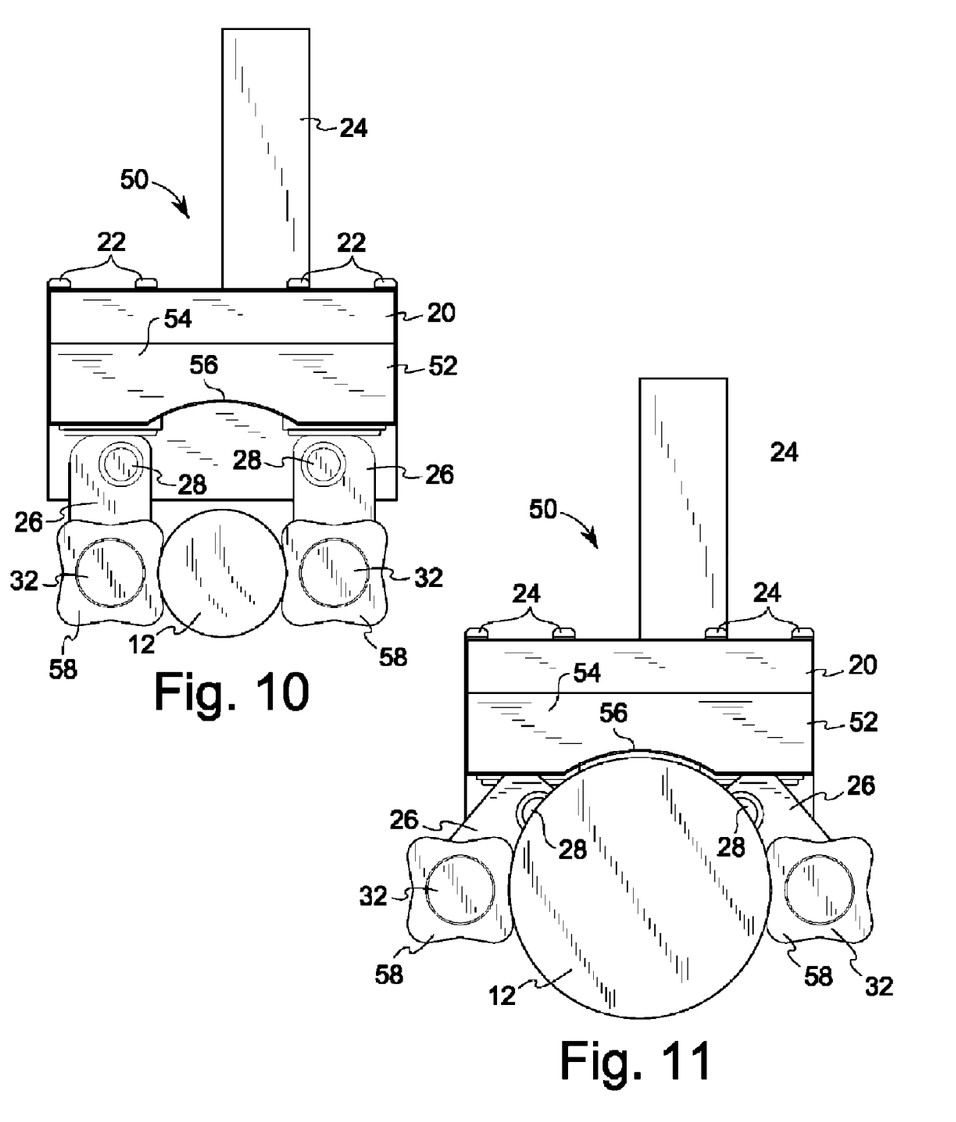
FIG. 10 is a front elevational view of a second embodiment of the bar puller, showing a small workpiece carried in the grippers.
FIG. 11 is a view similar to FIG. 10, showing a large workpiece carried in the grippers.

FIGS. 10 and 11 show a second embodiment of the bar puller. In this bar puller 50, similar parts are identified in the drawings by the same numbers used in FIGS. 1-9 in connection with bar puller 10. The body 52 is wider than prior body 14. In the wider body, bores 43 of FIGS. 3, 8, and 9 are juxtaposed to the outside edges of the body 52, which is similar to their relative positioning in body 14. The bores 43 are separated by an intermediate body portion 54 that is of similar width to the diameter of a bore 43, producing a body 52 that is about fifty percent wider than body 14. This additional width similarly increases the separation between pivot arms 26, which maintain their previously disclosed positions with respect to the bores 43 and springs 46.

The increased separation of pivot arms 26 increases both the minimum and maximum sizes of the billet 12 that the bar puller has capacity to handle. Thus, in FIG. 10 a billet 12 is approximately the minimum size that can be handled between pivot arms 26. Comparison with billet 12 of FIG. 8 suggests the degree of increase in minimum capacity. Although the billet 12 shown in FIG. 10 is substantially larger than the billet shown in FIG. 8, the minimum sized billet 12 shown in FIG. 10 has separated the ends of the pivot arms 26 by only a nominal amount. As with the smaller billet of FIG. 8, the pre-load on the pivot arms 26 and the corresponding high force generated by even small additional compression of the springs enables the bar puller 50 to be functional even when the pivot arms 26 are only nominally opened.

The chief purpose of creating the bar puller 50 is to handle larger billets than possible with smaller bar puller 10. The bar puller 10 having the dimensions given in the Example had capacity to handle a billet of 1.9 inches diameter. The bar puller 50 is of approximately the same size, with the exception of the wider body described above.

The billet 12 of FIG. 11 has three inch diameter, or is about fifty percent larger than the capacity of bar puller 10. In order to handle this increased capacity, the lower edge of intermediate body portion 54 is shaped as an upwardly concave arc 56 that can receive a peripheral edge of a sufficiently large billet 12, as shown in FIG. 11. The arc 56 is formed in the bottom of spring housing 16, which is the portion of the body 14 that overhangs the pivot arms as best shown in FIG. 7. The separation of the spring chambers allows an opportunity to establish a substantial arc in the intermediate body portion 54, where the arc does not interfere with the spring chambers. If the spring chambers and pivot arms are located more closely together, the potential size of the arc may be shorter.

The free ends of pivot arms 26 in FIGS. 10 and 11 carry rotary grips or end effectors 58 that differ in shape from the previously described rollers 30. The illustrated end effector is of representative shape of the class of polygonal gripping components that incorporate a plurality of acute angular gripping surfaces that may be either smooth or serrated across the gripping surface.

The specific end effector 58 shown in FIGS. 10 and 11 has four lobes arranged symmetrically in quadrants, resembling a quatrefoil. The four-lobed end effectors are rotatably attached near the bottom end of the respective pivot arms, at attachment points that are offset to the outside of the arm pins. Preferably, the end effectors 58 are mounted with each of the four lobes extending below the bottom of the pivot arm and inside the inside facing side wall surface of the pivot arm. In order for the lobes to extend as described, the end effector is sized to be sufficiently wider than a pivot arm and the axle pin is placed low enough for lobes to extend below the bottom of the pivot arm.

This four lobed end effector applies a larger surface contact area to the billet. The two point engagement formerly achieved with rollers 30 is replaced by at least four point engagement with end effectors 58. Each end effector 58 supplies at least two points of engagement with one point located on each of two neighboring lobes. Each end effector supplies a high contact point and a low contact point, relative to the center point established by the axle pin 32. The low contact point operates below the centerpoint of axle pin 32, simulating the performance of a pivot arm 26 of increased length. Because the end effectors 58 can rotate on axle pin 32, the lengthening is effective when the billet itself stabilizes the rotary position of the end effector. The application of four point contact stabilizes the billet within the grip of the end effectors, thus aiding in handling larger and heavier billets.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

What is claimed is:

1. A relocating tool for use when mounted on an automated machine that controls movement of the relocating tool to engage, reposition, and disengage a workpiece, wherein the relocating tool comprises:
a body that defines at least two parallel spring chambers, each spring chamber having a bottom opening and containing a spring, and a slidable piston is located in each spring chamber, below the spring in a position where the piston can be contacted near the bottom opening to raise the piston and correspondingly to compress the spring;
at least a pair of pivot arms that is attached to the body near their top ends by an arm pin that secures each pivot arm to the body and allows the opposite, bottom ends of the pivot arms to pivot between a position of relative minimum separation and a position of relative maximum separation;
wherein:
each pivot arm of the pair has an inside facing side wall surface that in the position of minimum separation is laterally nearest to the other pivot arm of the pair;
each pivot arm of the pair also has an outside facing side wall that when in the position of minimum separation is laterally opposite from the other pivot arm;
each pivot arm is attached to the body at a location where the respective pivot arm is associated by proximity with a different one of the spring chambers;
said arm pin maintains the top end of each pivot arm in juxtaposition to the bottom opening of the associated spring chamber, in a location where swinging the bottom ends of the pivot arms toward the position of maximum separation causes an outside end portion of the respective top ends to raise the pistons in the associated spring chambers and compress the contained springs;
the outside end portion of the top end of each pivot arm defines a cam that has a profile that is eccentric with respect to the arm pin of the pivot arm;
the eccentric cam profile controls how far the associated spring is compressed as each pivot arm progressively increases its angle of pivot toward the outside; and
the eccentric cam profile is such that with increasing pivot angle of a pivot arm, the cam compresses the associated spring along a displacement curve that increases at a decreasing rate.

2. The relocating tool of claim 1, wherein:
said cam profile is a quarter-circle arc, and
said arm pin is offset toward said inside facing sidewall surface from the center point of the circle establishing said quarter-circle arc.

3. The relocating tool of claim 1, wherein:
said spring is a urethane cylinder.

4. The relocating tool of claim 1, further comprising:
an end effector that is rotatably attached near said bottom end of each pivot arm, wherein the end effector is mounted to extend below said bottom of the pivot arm and inside said inside facing side wall surface of the pivot arm to receive, in use, a workpiece located between the pivot arms.

5. The relocating tool of claim 4, further comprising:
nonrotatable pressure elements applying braking force to said end effectors with respect to said axle pins to maintain engagement, in use, between the end effectors and an engaged workpiece.

6. The relocating tool of claim 4, wherein said end effector comprises:
a polygonal gripping component that incorporates a plurality of acute angular gripping surfaces.

7. The relocating tool of claim 1, further comprising:
a four-lobed end effector that is rotatably attached near said bottom end of each pivot arm, wherein the end effector is mounted with each of said four lobes can be positioned to extend below said bottom of the pivot arm and inside said inside facing side wall surface of the pivot arm to receive, in use, a workpiece located between the pivot arms.

8. The relocating tool of claim 4, wherein:
said body defines a spring housing containing said spring chambers at separated lateral positions, having an intermediate area between the separated spring chambers, wherein a central portion of the spring housing includes a portion of said intermediate area that overhangs said pivot arms;
said overhanging portion of the intermediate area is configured with a concave arc at its bottom for receiving, in use, the periphery of a workpiece engaged by said end effectors.

9. A bar puller for use when mounted on an automated machine that controls movement of the bar puller to engage, reposition, and disengage workpieces over a range of sizes, said bar puller comprising:
a body formed of an upper spring housing and a lower carrier bracket depending from the spring housing and offset to the rear of the spring housing such that the front of the spring housing forms an overhang above the front of the carrier bracket;
a pair of spring chambers located side-by-side in said spring housing, each having a bottom opening through the bottom of said overhang;
a cylindrical urethane spring located in each of said spring chambers;
a piston located in each of said spring chambers below said urethane spring and operatively contactable through said bottom opening to compress the spring;
a pair of pivotable arms attached to said carrier bracket for pivotal movement between a position of minimal separation and a position of maximum separation, where each pivotal arm is in a position aligned with one of said spring chambers and the contained spring and is attached at a sufficient height to the carrier bracket that when in said position of minimal separation, the top surface of each pivotable arm operatively compresses the aligned urethane spring, thereby establishing a pre-loaded spring force on the pivotable arm;
wherein each pivotable arm has a contact profile associated with its top surface that controls compression of the aligned spring, such that when the pivotable arm is pivoted from the position of minimal separation toward the position of maximum separation, the contact surface increases compression of the aligned spring;
wherein the contact profile is eccentric such that with progressive pivotal movement of the pivotable arm toward the position of maximum separation, spring compression is increased along a displacement curve that increases compression at a decreasing rate with increasing degree of pivot.

* * * * *